Patented Aug. 8, 1944

2,355,394

UNITED STATES PATENT OFFICE 2,355,394

PROCESS FOR PREPARING FOODS

Betsy Ross, Stouchsburg, Pa.

No Drawing. Application December 7, 1943,
Serial No. 513,306

7 Claims. (Cl. 99—124)

This invention relates to a process for making cooked dehydrated vegetables in comminuted condition and the products produced by such process. More specifically, this invention relates to making powdered dehydrated potatoes and similar starchy foods, as well as legumes, carrots, beets, cabbage, greens and the like.

Many methods have been proposed for dehydrating vegetables, such as potatoes, none of which has been entirely successful in producing a product that can be readily reconstituted and without considerable loss of its original valuable nutritional constitutents, particularly the vitamin C content. The most common method in dehydrating potatoes, for example, consists in peeling the potatoes, slicing, blanching with steam and then drying the slices in trays for about 5½ hours at a temperature not over 150° F. Such dehydrated potatoes readily discolor upon storage especially when the moisture exceeds 6% by weight. The dehydrated potatoes can be reconstituted only when they are first soaked for about 1 to 2 hours before cooking, and very often even after prolonged cooking the final cooked product is non-uniform.

An important nutritional constituent of potatoes is vitamin C which in prior dehydrating methods is nearly completely destroyed. It is well known that vitamin C is prone to rapid destruction and is the most difficult of all vitamins to retain in processed foods. In a recent book by Harry W. Van Loesecke, "Drying and Dehydration of Foods," 1943, page 222, it is stated, for example, that potatoes that are thoroughly steamed and then dehydrated do not retain significant amounts of vitamin C.

According to the present invention, it is possible to produce powdered dehydrated potatoes and other vegetables with a remarkably high vitamin C content, for example as much as 1130 I. U. per 100 grams of the product in dehydrated potatoes, and 3000 I. U. per 100 grams of potato sprouts. Furthermore, such product will not discolor or deteriorate on storage. The product is in addition readily reconstituted by boiling water in a few minutes for immediate consumption.

My process is particularly adapted for dehydrating the ordinary varities of white or Irish potato and other tubers, such as sweet potatoes, artichokes and the like. Such potato varieties as Irish cobbler, Triumph, Green Mountain, Early Ohio, Idaho Russet, Rural N. Y. No. 2 are satisfactory for use in my process. The potatoes are peeled and then are comminuted or sliced into thin pieces, say about $50/1000$ in. thick, by means of any suitable equipment and the thin pieces are then completely immersed in a bath of an edible oil, such as soya bean oil, peanut oil, cottonseed oil, corn oil, cocoanut oil and the like, heated to a predetermined temperature. Lard or lard oil, butter or butter oil, or hydrogenated edible oils may be used similarly if desired. The raw comminuted potatoes are immersed in the oil which has an initial temperature of not over 410° F. This is a critical initial temperature which is essential to permit the heated edible oil to penetrate the potato slice. A higher temperature tends to sear or seal the slices to such extent as to prevent the free escape of moisture from the potato. The remaining moisture within the potato slices will generate a steam pressure between the sealed outside surfaces of the slice. This pressure will split the slice between the outer sealed faces thus forming a bubble with walls only about half the thickness of the original slice. Due to these thin walls the hot edible oil readily penetrates into the interior of the slices during the further processing of the potato so as to yield a completely oil saturated and dehydrated product without undue disruption of the vegetable cell structure. The temperature of the oil is then reduced at approximately one minute intervals successively to 390° F., 380° F. and 360° F., the heat treatment in the oil thus being for a total period of about 4 minutes.

During this treatment the potatoes are uniformly cooked and completely dehydrated. The resultant product is removed from the oil bath and, preferably while still hot, is placed in a suitable open side press and subjected to a pressure in the order of about 10,000 pounds per square inch to express and remove the oil carried in the potato which may be originally as high as 40% by weight when removed from the oil bath. The product is then screened using a No. 14 mesh screen to remove any uncooked particles which contain moisture that would cause rancidity and deterioration in the final product when stored.

The final product thus produced as removed from the press is a dry light-colored powder of normally discrete non-agglomerating particles which contains not more than about 15% by weight of absorbed residual oil. A greater oil content is undesirable as it causes the product to agglomerate and tends to produce a pasty and mucky mass upon rehydration which does not produce a satisfactory uniform prepared food. This dry powdered potato is an excellent food and can be advantageously used for preparing dry powdered soup.

My product has a remarkably high vitamin C (ascorbic acid) content. For example, my dehydrated potato product has a vitamin C content anywhere from 800 to 1130 I. U. per 100 grams of the product. This is a very surprisingly high value, particularly since the generally accepted vitamin C content of raw potatoes is about from 10 to 15 mgms. per 100 grams. I do not have a scientific explanation for this resulting high vitamin C content of my product, but it appears that under the conditions of my treatment the ascorbic acid esters present in the raw vegetable are subjected to such conditions as to release the maximum ascorbic acid, none of which is lost as it is not oil-soluble and none is removed by any water in which it is soluble since the water is removed by evaporation. By subjecting the potato slices to a temperature of 410° F. steam is immediately generated which explodes the gross structure and permits even water evaporation therefrom. By tapering the heat down gradually to about 390°, 380° and finally at 360° F., the potato cells are not torn or fractured by excessive steam explosions so that a very homogenous, uniform product results. The tapering off of the initial temperature is thus very important for obtaining a satisfactory product, particularly in the case of potatoes which contain about 75% by weight of water, the solids being only 12 to 15% starch, 2 to 2½% protein and ash, and small amounts sugars, vitamin C, etc. Although it is preferred to treat the vegetables, particularly potatoes, within designated temperature ranges and intervals, satisfactory results may be obtained by treatment for 4 to 5 minutes within this range starting at about 410° and tapering down to a final temperature of about 360° F., and also for non-starchy vegetables in general from about an initial temperature of 400° F. to a final temperature of about 300° F.

Any desired dehydrated powdered foods, vegetables, flavoring and condiments in suitable proportions may be added to my powdered potato product for making a dry powdered soup. The following is an example of the proportions used in making a dry powdered soup from the dehydrated potato prepared by my process:

1 lb. 4 oz. powdered potato
 5 oz. dried skimmed milk
 1 oz. sodium glutamate
 ½ oz. onion powder
 2 tablespoons chopped parsley flakes
 1 tablespoon white pepper
 1 tablespoon paprika
 1 tablespoon tumeric
 1 tablespoon celery salt
 1 tablespoon oat flour
 12 tablespoons salt The above ingredients are thoroughly mixed to produce a homogenous mixture which is packaged in any suitable manner as, for example, in one ounce packages.

In preparing a soup this mixture is simply added to a suitable quantity of cold water, preferably 1 ounce of the mixture to 1½ cups water, stirred to prevent lumping and brought to a boil. Dispersion of the ingredients takes place readily. The soup so prepared is then ready for consumption. It has an excellent aroma, is very paratable and has a high vitamin content.

The dehydrated powdered potato made according to my process is, of course, suitable for any other food purposes. It will not spoil or deteriorate when kept for a long period at normal conditions. It is readily dispersible in water. If desired, a suitable quantity of an antioxidant or vegetative antioxigenic substance such as oat flour may be added to prevent rancidity in amounts from 0.1 to 1% by weight. Other suitable antioxidants may be added in small amounts from 0.01 to 1% such as gum guaic, lecithin or stearolated pyrogallol. My final product is highly hygroscopic so that it is desirable to package same in suitable moisture-proof and vapor-proof containers so that the moisture absorbed does not exceed 3% because otherwise rancidity and deterioration of the product will occur during storage.

Other types of vegetables may be similarly dehydrated by treating the suitably comminuted fresh vegetables in the edible oil as previously described. My process is suitable for producing dehydrated comminuted sweet potatoes, asparagus, green beans, lima beans, beets, cabbage, broccoli, carrots, celery, tomatoes, greens, onions, peas, potato sprouts, etc. In the case of high sugar content vegetables, such as sweet potatoes, lower dehydration temperatures are preferred as compared with sugar-free vegetables in order to avoid a tendency to burn or caramelize the vegetables at too high temperatures. For example, in the case of dehydrating sweet potatoes, I prefer to use an initial temperature of 300° F. and taper down to 240° F. The products produced from these vegetables according to my process have a very high vitamin C content and the same unique physical and rehydration properties previously described in connection with my potato product. These products are particularly adapted for use in soups and similar prepared foods.

This application is a continuation in part of application Serial No. 447,854, filed June 20, 1942.

Changes and modifications may be made in practicing my invention which are intended to be covered within the scope of the appended claims.

I claim:

1. A process for preparing dehydrated cooked vegetables which comprises comminuting the raw vegetable into thin pieces, immersing the pieces in a bath of edible oil at an initial temperature of about 410° F., then after one minute reducing the temperature at successive intervals of about one minute to 390°, 380° and 360° F. for a total treating time of about four minutes, to remove the water present and completely cook the vegetable, and pressing the dehydrated vegetable to remove retained oil and produce a dry powdered vegetable consisting of normally discrete non-agglomerating particles.

2. A process for preparing dehydrated cooked potatoes which comprises comminuting the raw peeled potatoes into thin pieces in a bath of edible oil at an initial temperature of about 410° F., then after one minute reducing the temperature at successive intervals of about one minute to 390°, 380° and 360° for a total treating time of about four minutes, to remove water present and completely cook the potatoes, and pressing the dehydrated potatoes to remove retained oil and produce a dry powdered potato consisting of normally discrete non-agglomerating particles.

3. A process for preparing dehydrated cooked vegetables which comprises comminuting the raw vegetable into thin pieces, immersing the pieces in a bath of edible oil at an initial temperature of about 410° F., then after one minute reducing the temperature at successive intervals of about one minute to 390°, 380° and 360° for a total treating time of about four minutes, to remove the water present and completely cook the vegetable, pressing the dehydrated vegetable to remove retained oil and produce a dry powdered vegetable and screening the product to remove any uncooked moisture-containing particles.

4. A process for preparing dehydrated cooked potatoes which comprises comminuting the raw peeled potatoes into thin pieces, immersing the pieces in a bath of edible oil at an initial temperature of about 410° F., then after one minute reducing the temperature at successive intervals of about one minutes to 390°, 380° and 360° for a total treating time of about four minutes, to remove the water present and completely cook the potato, pressing the dehydrated potato to remove retained oil and produce a dry powdered potato and screening the product through a No. 14 mesh screen to remove any uncooked moisture-containing potato particles.

5. A process for preparing dehydrated cooked vegetables which comprises comminuting the raw vegetable into thin pieces, treating the pieces for about four minutes in a bath of edible oil at an initial temperature of about 410° F. to a final temperature of about 360° F., to remove the water present and completely cook the vegetable, and pressing the dehydrated vegetable to remove retained oil and produce a dry powdered vegetable.

6. A process for preparing dehydrated cooked vegetables which comprises comminuting the raw vegetable into thin pieces treating the pieces for about four minutes in a bath of edible oil at an initial temperature of about 400° F. to a final temperature of about 300° F., to remove the water present and completely cook the vegetable, and pressing the dehydrated vegetable to remove retained oil and produce a dry powdered vegetable.

7. A process for preparing dehydrated cooked sugar-containing vegetables which comprises comminuting the raw vegetable into thin pieces, treating the pieces for about four minutes in a bath of edible oil at an initial temperature of about 300° F. to a final temperature of about 240° F., to remove the water present and completely cook the vegetable, and pressing the dehydrated vegetable to remove retained oil and produce a dry powdered vegetable.

BETSY ROSS.